Sept. 17, 1935.  F. W. RIGGS  2,014,452

BOX MAKING APPARATUS

Filed June 21, 1932  8 Sheets-Sheet 1

Fig. 1

INVENTOR
F.W.Riggs
BY
ATTORNEY

Sept. 17, 1935.  F. W. RIGGS  2,014,452
BOX MAKING APPARATUS
Filed June 21, 1932  8 Sheets-Sheet 3

INVENTOR
F. W. Riggs
BY
ATTORNEY

Sept. 17, 1935.   F. W. RIGGS   2,014,452
BOX MAKING APPARATUS
Filed June 21, 1932   8 Sheets-Sheet 4

INVENTOR
F. W. Riggs
ATTORNEY

Sept. 17, 1935.  F. W. RIGGS  2,014,452
BOX MAKING APPARATUS
Filed June 21, 1932  8 Sheets-Sheet 5

Patented Sept. 17, 1935

2,014,452

UNITED STATES PATENT OFFICE 2,014,452

BOX MAKING APPARATUS

Fred W. Riggs, San Jose, Calif., assignor to Donald Parker and Citizens National Trust and Savings Bank of Riverside, administrators of George D. Parker, deceased Application June 21, 1932, Serial No. 618,423

20 Claims. (Cl. 1—14)

This invention relates to the making of produce shipping boxes and particularly, in the construction herein shown, to the making of heads for the crates in which lettuce, artichokes, cauliflower etc. are packed for shipment.

Such crate heads are built up of end posts and side rails to form a rectangular frame, on which the end slats and a central panel are nailed. Heretofore the frame parts have been assembled and spiked together first and then stacked and fed to a nailing machine; the slats and panel being positioned on the frame by hand or otherwise while the frame is moving toward the nailing machine. This method of manufacture obviously requires the use of several machines and a considerable number of hand operations with a correspondingly relatively high cost. Also when the slats are placed by hand they are frequently misalined when nailed resulting in defective heads which must be discarded and further increasing the aggregate cost.

The principal object of my invention is to provide a machine by means of which all the parts of the heads are automatically assembled in proper relation to each other and fed as a unit to a single nailing machine in such a manner that the frame parts may be spiked together simultaneously with the nailing of the slats and panel onto said parts. Time and hand labor operations are therefore reduced to a minimum since the operation of the apparatus only requires the services of one man to keep the hoppers for the various parts properly supplied and the cost of manufacture of crate heads and like units is consequently considerably less than the present method of manufacture.

The apparatus includes means to automatically feed the parts toward the nailing machine and another object of my invention is to provide a means between the feeding mechanism and the actuating mechanism of the nailing machine so that operation of the latter is controlled by the feed means at the proper instant. In this manner the nailing machine may operate at the speed necessary for effective nailing while the feeding means may operate at a different speed or one which will be most efficient for speedy feeding operations.

A further object is to arrange the assembling and feeding mechanism in compact unitary relationship with the nailing machine so that the entire apparatus takes up a minimum of floor space and servicing of the structure as a whole is facilitated.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Referring now more particularly to the characters of reference on the drawings, the nailing machine used in connection with the apparatus includes a frame 1 having a flat supporting surface 2 on which the structure to be nailed rests and which is then superimposed by the vertically movable frame structure 3 of the nailing machine which carries the depending nail positioning and plunger units 4. The structure 3 is connected by rods 5 to cranks 6 on a transverse shaft 7 on which a gear 8 is turnably mounted. This gear is engaged by a pinion 9 fixed on a shaft 10 suitably driven by an electric motor 11 or the like. A clutch 12 of a type commonly used in press punches is mounted on the shaft 6, one element of the clutch being fixed to the gear 8 and the other to said shaft. Normally the clutch is held disengaged so that the gear is free to turn on the shaft by means of a vertical arm 13 pivoted at its upper end in connection with the frame 1 and bearing at its lower end on the dog 14 of the clutch in such a manner that the tendency of the clutch to rotate and thus function is frustrated unless the arm is moved clear of the dog.

The purpose of this arrangement and the moving of the arm at the proper time will be set forth later.

Figure 1:
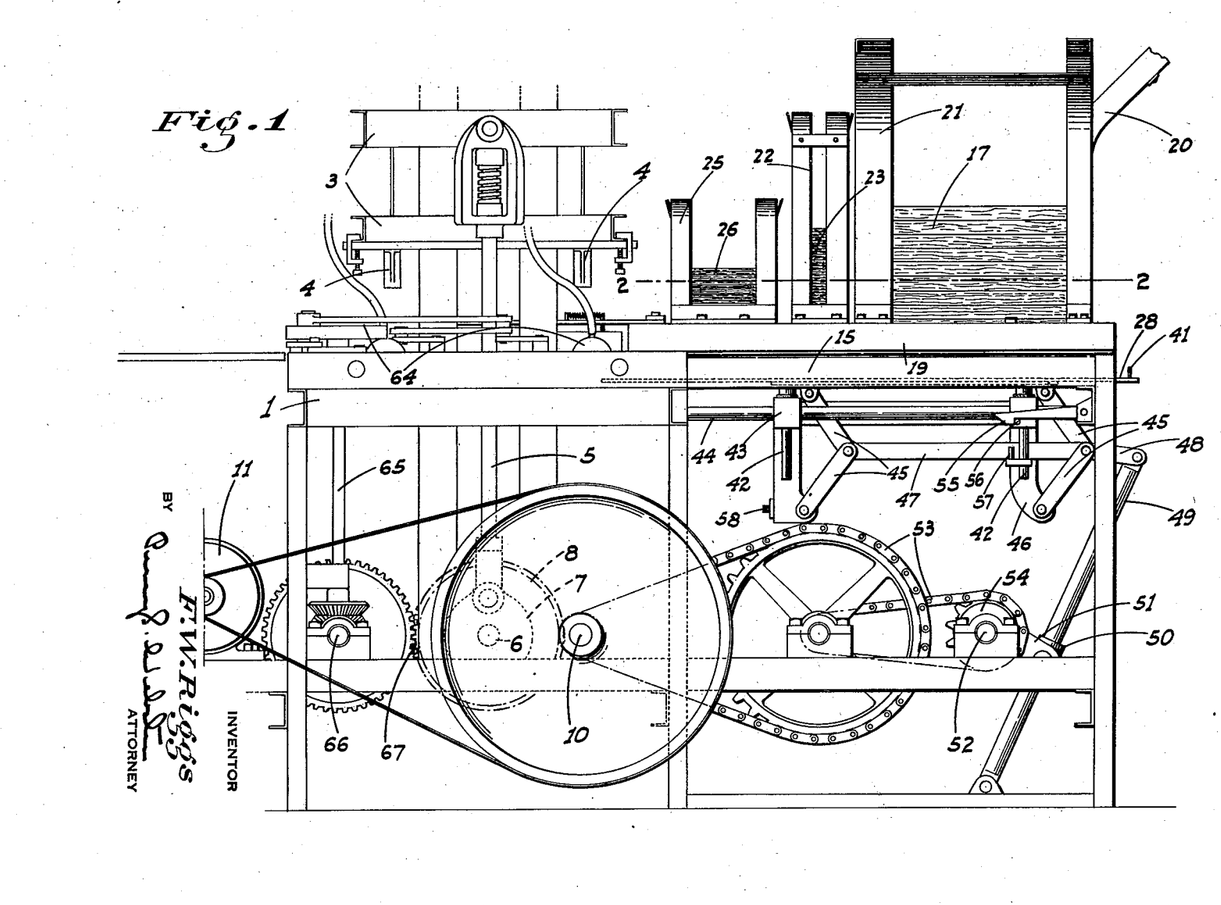
Fig. 1 is a side elevation of the assembling and feeding apparatus shown in connection with a nailing machine; the feed unit being at the back end of its stroke but still in a non-feeding position.
Figure 2:
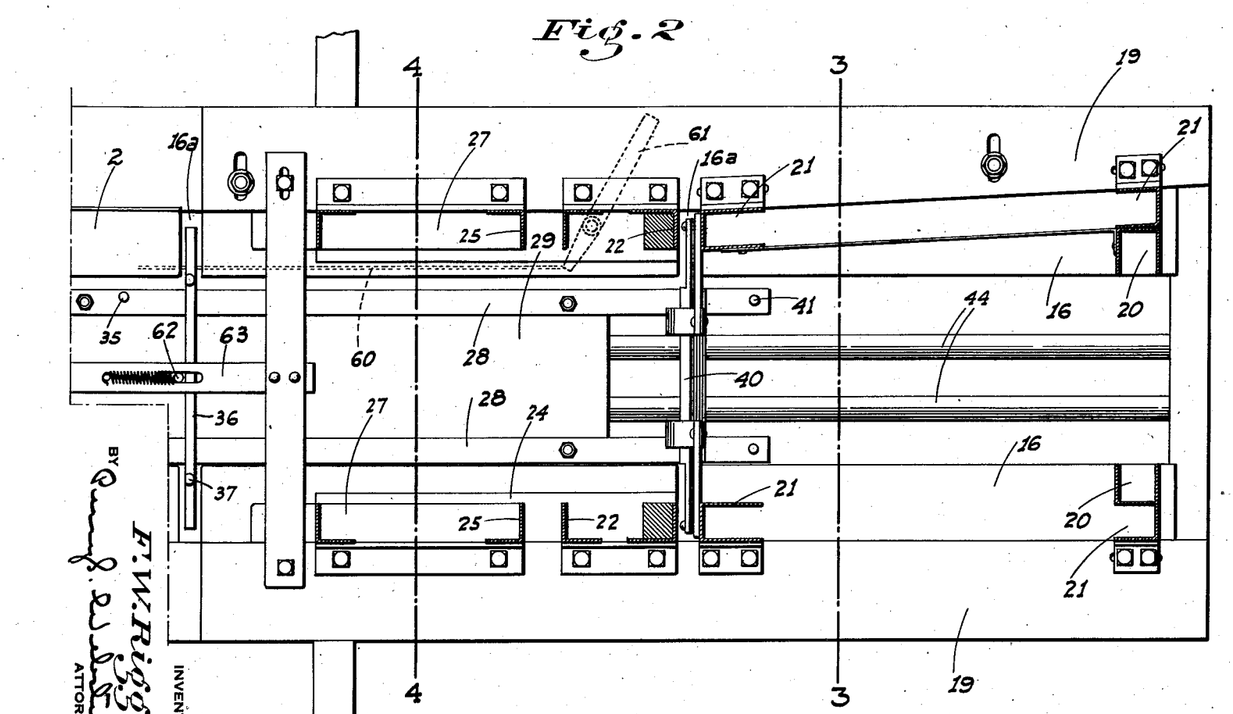
Fig. 2 is a top plan view of the apparatus with the hoppers shown in section as on the line 2—2 of Fig. 1 and with the feed unit fully advanced.

Rigid with and projecting forwardly from the frame 1 are the side frames 15 of the assembling and feeding apparatus. Supporting plates 16 for the side rails 17 and the end posts 18 of the crate heads project inwardly from the frames 15 in horizontal alinement with the surface 2. Guide rails 19 project upwardly from the plates 16 and extend along the opposite side edges thereof to guide and maintain the parts of the crate head against lateral displacement. One guide rail converges toward the other from its outer end as shown in Fig. 2 for a distance substantially equal to the length of a rail and then extends parallel to said opposite rail so as to be spaced therefrom a distance but slightly greater than the total width of a head.

A hopper for the end posts is mounted in overhanging connection with the plates 16 at their outer ends, said hopper comprising transversely separated upstanding channel shaped guide members 20 for the end portions of said posts. Hopper elements 21 of similar form are provided to engage the ends of the side rails and maintain them parallel to the adjacent portions of the guide rails 19; said elements being associated with the plates 16 just inwardly of said rails. One pair of said elements is alined with and disposed outwardly of the members 20 so that the end posts in said members are disposed between the side rails and are alined with the adjacent ends of the rails, as is the position occupied thereby in the finished crate head. The sloping arrangement of one guard rail at this end provides room for the necessary positioning of the hopper elements in side by side relation.

Just beyond the advanced pair of elements 21 or nearest the nailing machine are upstanding transversely spaced hopper elements 22 to engage and locate the ends of the end slats 23 of the heads which extend cross-wise of the plates 16 in overhanging relation thereto between the guide rails. The lowest slat does not rest on the plates 16 however but on other supporting plates 24 mounted directly above and parallel to said plates 16 and spaced above the same a distance slightly greater than the depth of a rail or post.

A short distance beyond the slat hopper are transversely spaced hopper elements 25 for the central panels 26 of the heads which are also disposed transversely of the apparatus and between the guide rails 19. The lowest panel at its ends rests neither on the plates 16 nor 24 but on separate longitudinally extending supporting plates 27 which are disposed above the plates 24 a distance slightly greater than the thickness of a slat. With this arrangement one end post and a pair of opposed side rails are normally resting on the plate 16 directly below the corresponding hoppers and one edge of the end slats and central panels rests on the corresponding plates 24 and 27. It is to be understood that the lower ends of the various hoppers terminate above the corresponding part supporting plates a sufficient distance to permit of horizontal movement of only one part at a time from under the hoppers.

To engage these parts and assemble them in proper relation to each other and then feed such parts as a unit to the nailing machine, I provide a special mechanism. This mechanism comprises a pair of transversely spaced horizontal bars 28 spaced apart a distance less than the spacing between the plates 16 and adapted to be removably bolted onto a supporting platform or table 29, which is reciprocated horizontally as well as vertically in a particular manner as hereinafter described.

Projecting upwardly from the bars in predetermined longitudinally spaced relation from the forward end or that nearest the nailing machine are head pushing lugs 30, post pushing pins 31, end slat pushing pins 32, center panel rests 33, center panel pushing pins 34, end slat rests 35, a cross bar 36 to engage an end post and the ends of a pair of side rails simultaneously and having end slat pushing pins 37 projecting upwardly therefrom, end post pushing pins 38, end slat pushing pins 39, a cross bar 40 to engage an end post and the ends of a pair of side rails simultaneously, and end post pushing pins 41. All the above elements are disposed in successive order along the bars as recited and their relative spacing depends on the size and spacing of the parts of the head to each other as will be hereinafter seen.

If a head or other unit is being assembled in which the length or width of the various parts varies, a feeding unit having a different spacing and arrangement of feeding pins is mounted on the table 29 in place of the one above described.

The table 29 is mounted for the desired movement as follows. Transversely spaced pairs of stems 42 depend from the table at longitudinally spaced intervals which are slidably guided for vertical movement in blocks 43 connected together as a unit and forming a frame. These blocks are slidably supported on horizontal rods 44 mounted in connection with the framework of the structure and extending lengthwise thereof and under the nailing machine. Pairs of toggle links 45 are pivoted at their opposite ends in a common vertical plane to the table and to depending extensions 46 of the blocks 43, the adjacent ends of the pairs of toggle links being connected by longitudinally extending links 47.

Figures 5, 6:
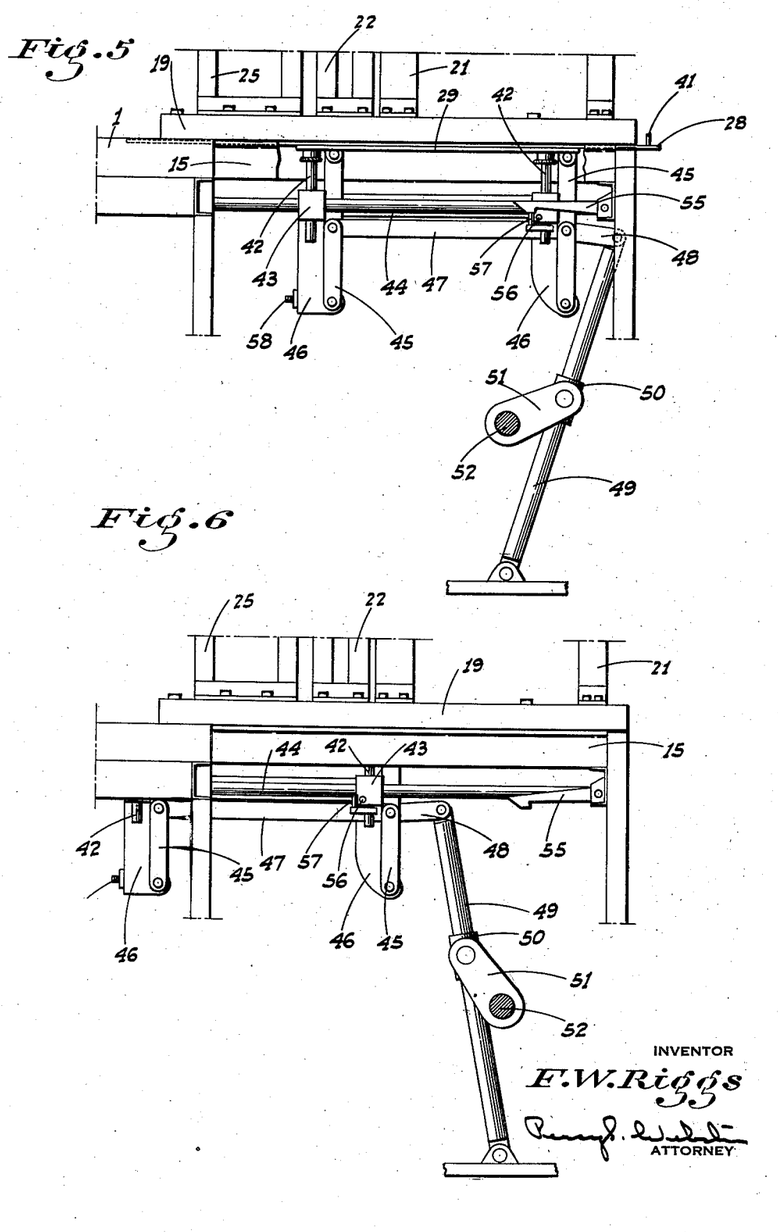
Fig. 5 is a fragmentary side elevation of the apparatus showing the feed unit at the back end of its stroke and with said unit as initially raised to a feeding position.
Fig. 6 is a similar view showing the unit partly advanced.

The toggle links are disposed to the sides of the blocks opposite the nailing machine so that they will buckle in a corresponding direction and are held from buckling in the opposite direction and when they are moved to a vertical position by the fact that they then abut against the adjacent faces of the blocks as shown in Figs. 5 and 6.

The length of the toggle links by relationship of the blocks to the table is such that when the table is at its lowest position relative to the blocks and the links are buckled somewhat all the pins and bars on the members 28 are below the level of the plates 16 and any parts supported thereon. On the other hand when the links are vertically disposed and the table is fully raised said pins etc. are properly positioned to engage and feed only the lowermost corresponding members of the crate heads.

The links 48 are connected to one end of the linkage 47 and to the upper end of an oscillating lever 49 which is pivoted at its lower end in connection with the frame of the structure. This lever is engaged intermediate its ends by a sleeve 50 swiveled on a crank arm 51 secured to a shaft 52. This shaft is parallel to the shaft 10 and is connected so as to be driven therefrom by a suitable chain or chain gearing 53. A safety clutch indicated at 54 is preferably interposed between the shaft 52 and the adjacent driving element on the shaft so that movement of the feed mechanism will be halted and breakage prevented if any slat or other part should jam at some point, even though this is very unlikely on account of the simplicity of the structure and the positive action of the feed unit.

Figures 7, 14:
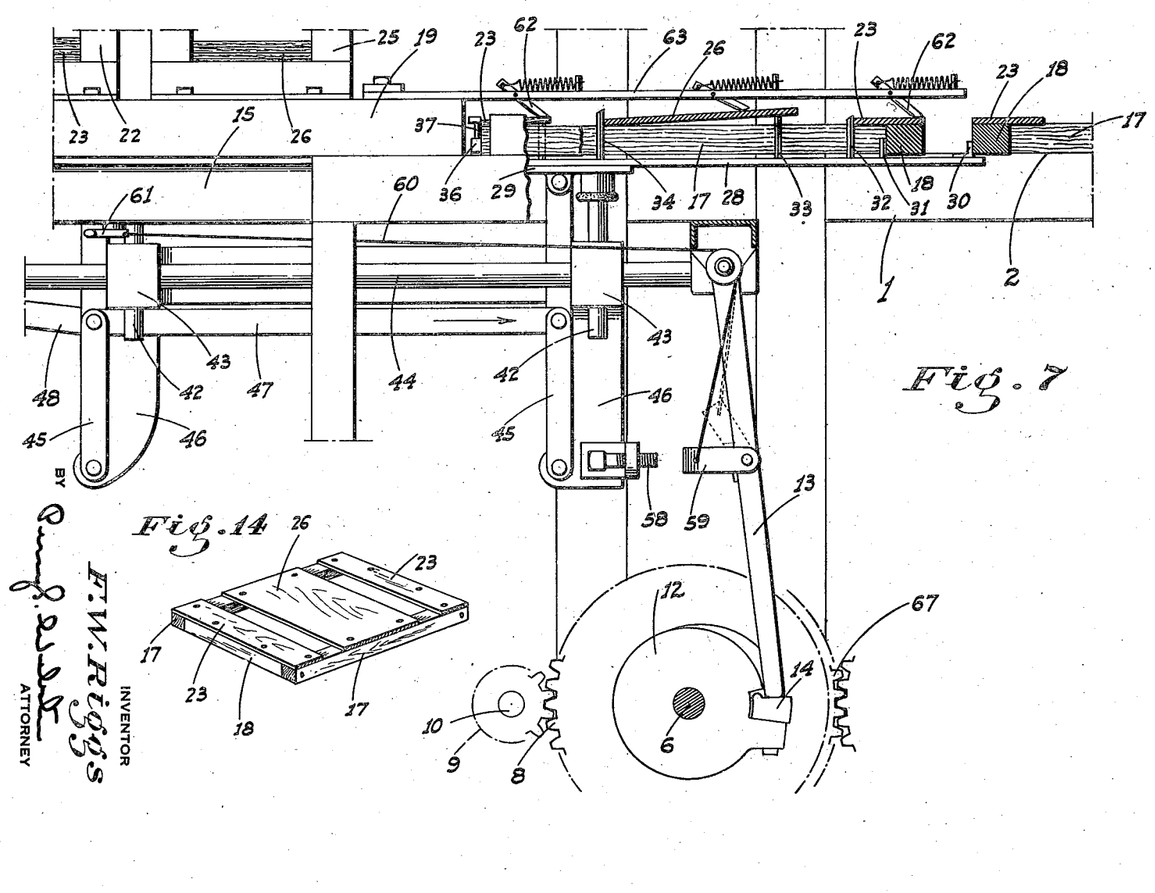
Fig. 7 is a fragmentary side elevation partly in section of the apparatus on the opposite side from Fig. 1 showing the means for controlling the actuation of the nailing machine by the advance of the feed mechanism.
Fig. 14 is a perspective view of a finished crate head.

The length of the stroke imparted to the lever 49 by the crank 51 is sufficient to move the table lengthwise a distance somewhat greater than the length of a crate head. In operation it will be seen that with the rotation of the crank a movement of the lever from the advanced end of a stroke of the table first folds or buckles the links so that the table will be lowered and then moves the table horizontally to the retracted end of its stroke. A reverse movement of the lever then first unfolds or extends the links so that the table is raised and then causes the latter to be moved lengthwise in its raised position at said advanced end of the stroke. To insure the table being raised before any longitudinal movement is imparted thereto I mount a horizontal catch dog 55 in fixed pivoted connection with the frame of the structure. This dog is adapted to engage a pin 56 projecting laterally from one of the blocks 53 when said blocks and table reach the limit of the stroke in a retractive direction. To release the dog from the pin as the links are raised to their outstretched position with the initial advancing oscillation of the lever, I mount a vertical pin 57 under the dog in connection with the adjacent stem 42. This pin is positioned to engage and raise the dog clear of the pin 56 as the links reach a fully extended position. As the table approaches the advanced end of the stroke, at which time the parts of the crate head have been moved into a nailing position as will be explained, a projection 58 on the adjacent extension 46 engages an element 59 projecting forwardly from the arm 13 as shown in Fig. 7 and pushes said arm clear of the clutch dog 14. This allows the clutch to function and causes the constantly rotating gear 8 to be placed in driving connection with the shaft 6. The nailing mechanism then functions in the usual manner.

The member 59 is pivoted on the arm 13 and is movably supported in position to be engaged by said projection 58 by a flexible element 60 connected thereto and to a conveniently positioned hand lever 61. In this manner the member 59 may be raised so as not to be engaged by the projection and the nailing mechanism will not function regardless of the reciprocation of the table. This is necessary in the initial operation of the machine as will now be explained.

Figure 8:
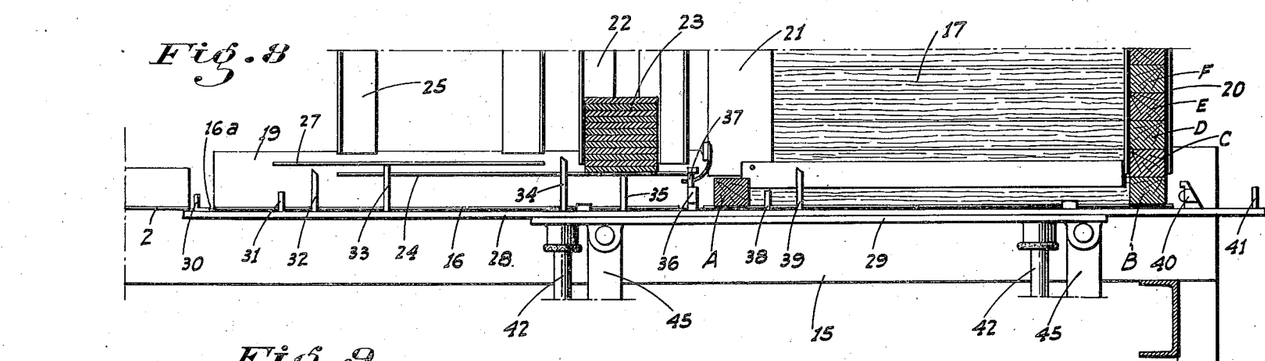
Fig. 8 is a fragmentary longitudinal section of the apparatus showing the position of the parts to be advanced by the unit at the retracted end of the feed stroke and at the outset of operations.

In operation when starting on a run the table and feed unit are first positioned in the retracted end of the stroke, as shown in Fig. 2. The bar 40 is then behind the end post hopper and the adjacent side rail hopper members, as shown in Fig. 8. An end post A is placed by hand just ahead of the pins 38 while the lowest post B in the hopper is naturally resting on the side plates 16 in front of the bar 40. A supply of end slats 23 is placed in the proper hopper but the central panel hopper remains empty for the time being. Also the member 59 is raised temporarily.

Figure 9:
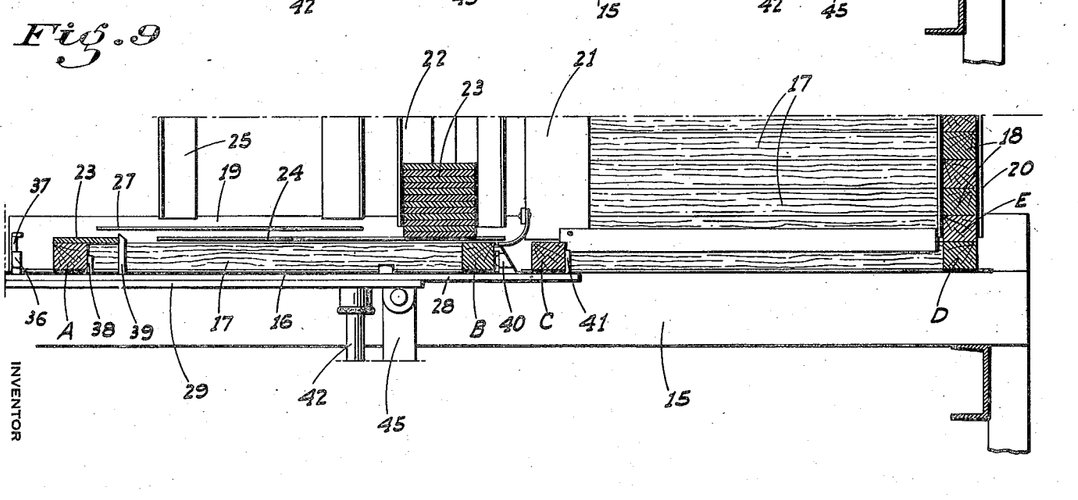
Fig. 9 is a similar view showing the feed unit at the advanced end of the first stroke.

With the advancing movement of the feed unit the post A is engaged by the pins 38 and advanced toward the nailing machine. At the same time the post B and a pair of side rails 17 are engaged by the bar 40 and simultaneously advanced. As the post A passes under the end slat hopper the pins 39 engage the lowest slat and advance it, the position of these pins relative to the pins 38 being such that said slat is then and there properly positioned relative to the adjacent post A, as shown in Fig. 9. As soon as the bar 40 moves ahead of the post hopper another post C drops down and is engaged and advanced by the pins 41, another post D dropping into position on the plates 16 back of the pins 41 to be subsequently engaged.

At the advanced end of the stroke as shown in Fig. 9 the post A is beyond the central panel hopper, the post B is just back of the end slat hopper, while the post C is back of the post B or in a position close to the initial position of the post A.

Figure 10:
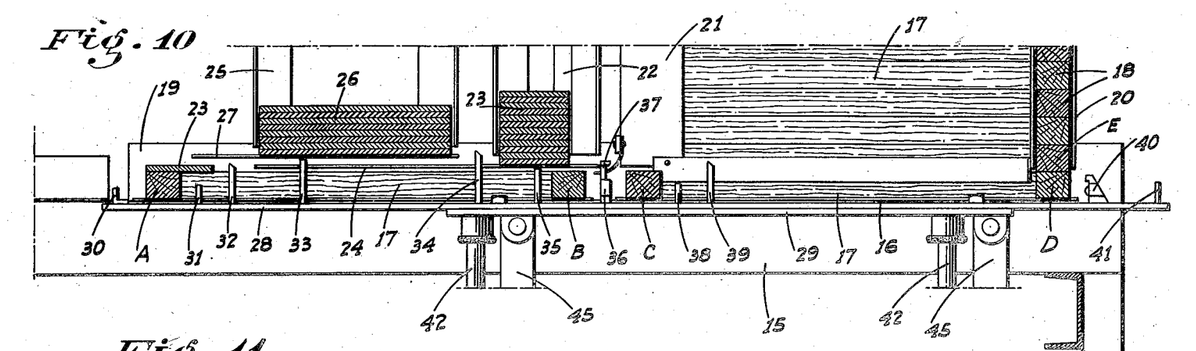
Fig. 10 is a similar view showing the feed unit at the successive retracted end of its stroke.
Figure 11:
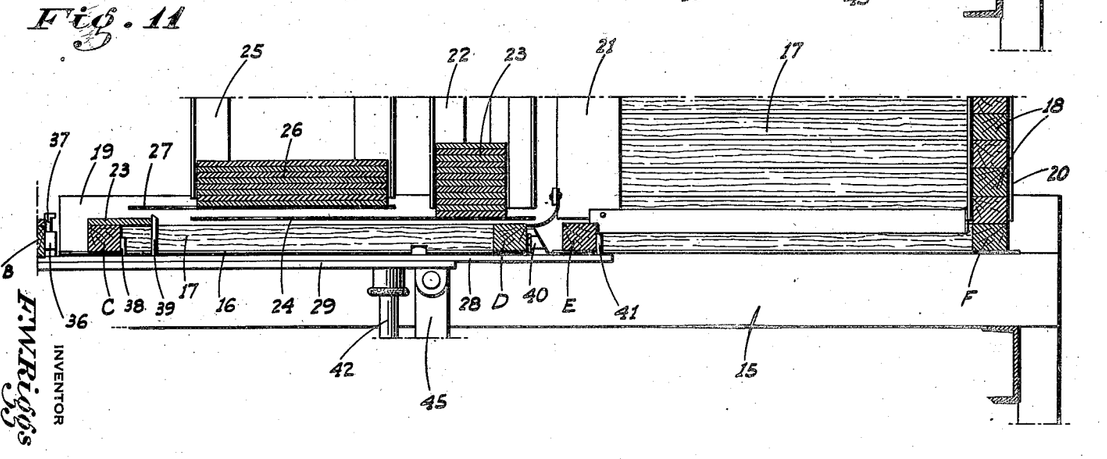
Fig. 11 is a similar view showing the feed unit at the advanced end of its succeeding feed stroke.
Figure 12:
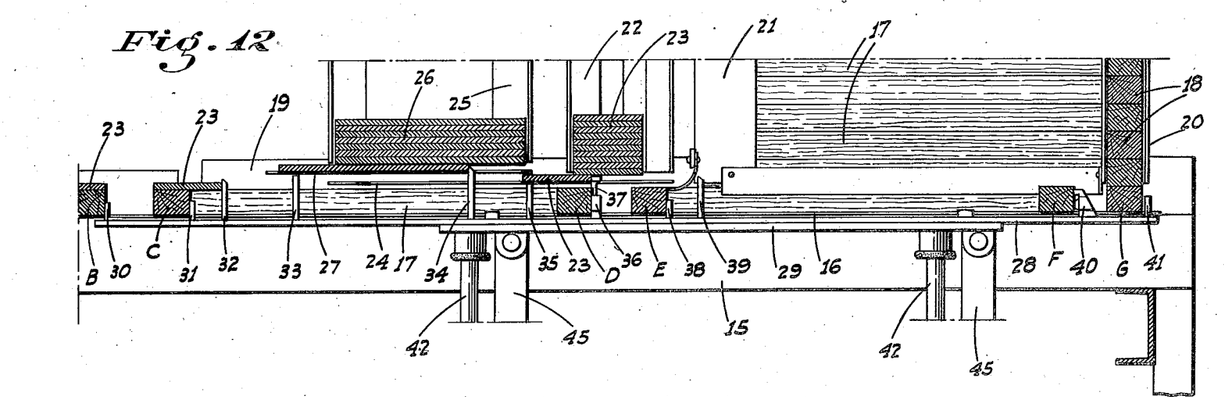
Fig. 12 is a similar view showing the feed unit partly advanced on a successive stroke.
Figure 13:
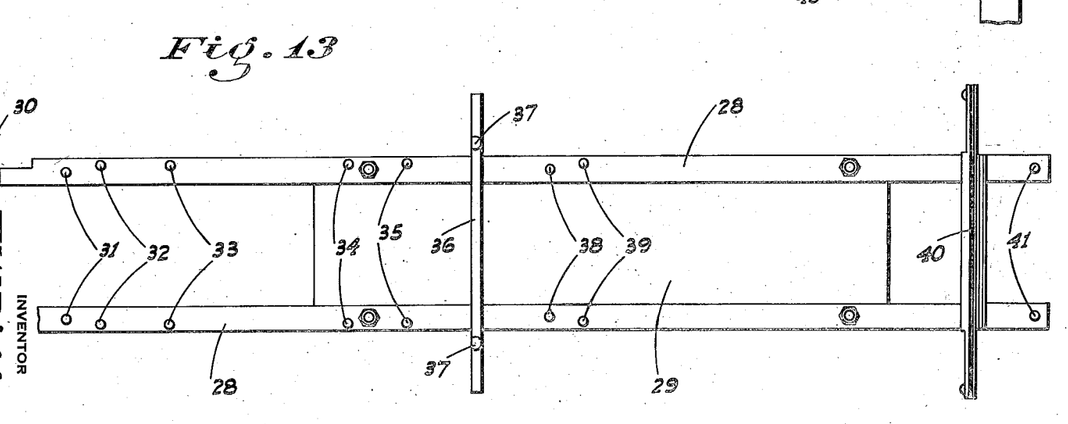
Fig. 13 is a top plan view of the feed unit.

The feed unit then drops abruptly down by the buckling action of the toggle links had with the retractive oscillation of the lever 49 as previously explained and the feed unit moves back to a starting position clear of the parts already advanced and is then again abruptly raised to its initial position, or as shown in Fig. 10. The pins 31 are then back of the post A, the bar 36 is back of the post B, the pins 38 are back of the post C, and the bar 40 is back of the post D. With the advance of the feed unit the post A and the adjacent end slat are engaged and advanced by the pins 31 and 32 respectively; the post B is advanced by the bar 36 and the adjacent end slat from the hopper is engaged and advanced in alinement therewith by the pins 37 on said bar; the post C and a subsequent slat are engaged and advanced by the pins 38 and 39 respectively; while the post D and a pair of side rails and a subsequent post E are in turn engaged and advanced by the bar 40 and the pins 41 respectively as previously explained. In the meantime a central panel 26 from the hopper is engaged and advanced by the pins 24 as shown in Fig. 12. Therefore when the first crate head assembly, which includes the posts A and B, is fully advanced the second time and which places them in proper position to be nailed, the necessary end slats and central panel are arranged in proper superimposed position thereon.

The slat and panel supporting plates 24 and 27 respectively terminate ahead of the final fully advanced position of the unit so that said slats and panels are then supported directly on the posts and rails. The rests 33 and 35 break the drop of the corresponding parts somewhat as they leave the supporting plates so that they will not tend to become misalined. Further assurance of the slats being held in place is had by means of spring pressed fingers 62 mounted on a horizontal bar 63 projecting into the nailing machine and disposed over and bearing against the slats and panel as the crate head is moved into a nailing position. With the advancing stroke of the feed unit which carries a full complement of crate head parts into nailing position, the member 59 is lowered into position to be engaged by the projection 58 in the advancing end of this stroke so that the nailing machine will then function.

With each repeated reciprocation of the feed unit another assembly of crate head parts is advanced, the nailing operations taking place during the retracting stroke of the unit. With each advance of the unit the lugs 30 then engage a nailed head and shove the same out of the machine. The distance between the corresponding faces of the pins 31 and the bar 36 and between the pins 38 and the bar 40 is equal to the full length of a crate head minus the thickness of one end post, so that both posts will be positioned flush with the corresponding ends of the side rails. The panel advancing pins 34 are positioned relative to the pins 31 and the bar 36 so that a panel as engaged will be disposed centrally along the head; while the pins 32 and 39 are disposed relative to the pins 31 and 38 respectively so that the forward ends of the slats engaged by the former are flush with the forward ends of the corresponding posts.

Figure 3:
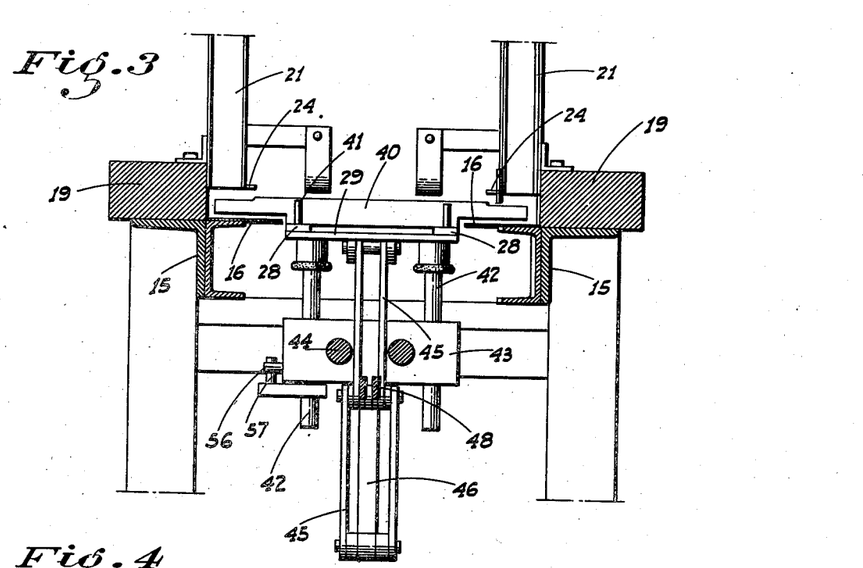
Fig. 3 is a transverse section on the line 3—3 of Fig. 2.
Figure 4:
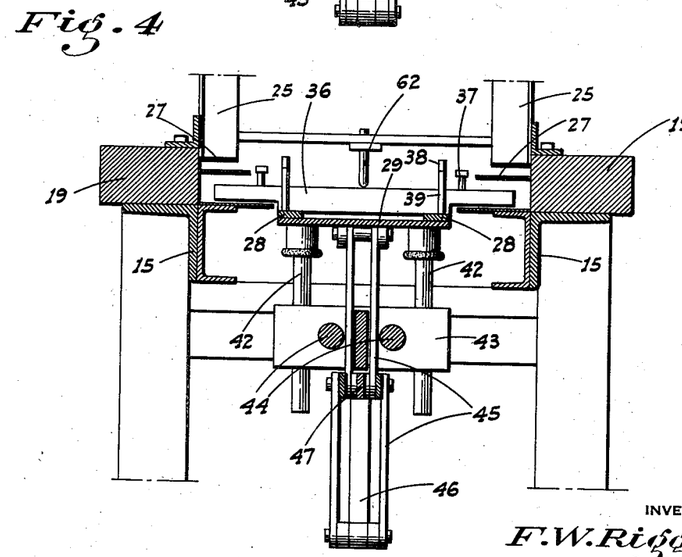
Fig. 4 is a similar section on the line 4—4 of Fig. 2.

Since the bars 36 and 40 engage the side rails as well as the end posts they must overhang the plates 16. The end posts of these bars are therefore cut away on their under sides outwardly of the bars 28 so that the overhanging portions will clear said plates, as shown in Figs. 3 and 4. The plates 16 and gaps 24 therein, as shown in Fig. 2 are positioned to allow said portions to move vertically from above or below the plates at the ends of the stroke of the feed unit.

The crate head is fed into the nailing machine lengthwise of itself, the outer sides of the side rails facing laterally of the machine. This arrangement of the parts makes it convenient to mount and operate rail and post spiking mechanism in connection with the nailing machine to the sides of the same. One of such mechanism is indicated generally at 64 and is preferably of substantially the same character as that shown in the Patent No. 1,397,054, dated November 15, 1921, granted to A. N. Riggs; being of course set on its side or horizontally so that the spikes will be driven horizontally instead of vertically. The operating shafts 65 of the two laterally operating spiking mechanisms are driven from a transverse shaft 66 which is connected to the shaft 6 by gearing which includes a gear 67 fixed on the shaft 6. The functioning of the spiking mechanism as well as the vertical nailing mechanism is therefore controlled by the engagement of the clutch 12 as will be evident.

While, as previously stated, the apparatus in the present instance has been shown especially for making crate heads, it will be obvious that by a change of size or rearrangement of the hoppers and of the stroke of the feed unit and other features, the same mechanism generally can be used in connection with the making of box structures other than crate heads.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

I claim:

1. An apparatus for making crate heads which consists of side rails, end posts, end slats and a central panel, said apparatus comprising with a nailing machine, transversely spaced hoppers for the side rails located ahead of the machine, a single hopper for the end posts disposed between the rail hoppers at the end thereof furthest from the machine, reciprocating means for feeding a pair of said rails and end posts simultaneously to the nailing machine and for causing a pair of the latter from the one hopper to be disposed at the opposite ends of the side rails with successive reciprocations of said means, hoppers for the end slats and central panel and means included with said feeding means to also feed the slats and panels and dispose them in properly assembled relation to the posts and rails.

2. Apparatus for making crate heads which consists of side rails, end posts, end slats and a central panel, said apparatus comprising with a nailing machine separate hoppers for the side rails and posts in front of the machine to maintain the rails in spaced relation and the posts in position therebetween and in angular relation thereto, common supports for the lowermost rails and posts, a single end-slat hopper disposed between the rail hoppers and the machine and arranged to maintain a stack of slats in parallel relation to the posts, a hopper for the central panels disposed between the slat hopper and the machine and arranged to maintain said panels parallel to the slats, supports for the lowermost end slat disposed above the plane of the lowest side rails and posts, supports for the lowermost central panel disposed above the plane of the lowest end slat, and feeding means arranged as a single unit to engage the supported parts of a crate head in predetermined order and advance them to a nailing position and arranged with such advancement, to move said parts into properly assembled relation with each other.

3. A structure as in claim 2, in which said unit includes a member to engage an end post and the ends of a pair of side rails simultaneously, an element to engage the supported slat only, another element to engage the supported panel only, and another element to engage an end slat only.

4. A structure as in claim 2, in which said unit includes a member to engage an end post and the ends of a pair of side rails simultaneously, an element behind said member to engage an end post only, a second element ahead of the member to engage a supported end slat only, a third element ahead of said second element to engage an end post only, a bar ahead of said third element to engage an end post and the ends of a pair of side rails, end slat engaging pins projecting upwardly from the bar, a fourth element ahead of the bar to engage the supported panel, a fifth element ahead of the fourth element to engage a supported end slat, and a sixth element ahead of said fifth element to engage an end post only.

5. A structure as in claim 2, with means provided with said unit to advance a nailed head out of the machine with an advancing movement of the feeding means subsequent to that necessary to feed the parts into a nailing position.

6. In box making machinery, a nailing machine, hoppers for separate box parts positioned in front of the machine, horizontal supporting means for the lowermost parts to maintain them at a predetermined level, a frame unit, means mounting said unit for horizontal movement toward and from the machine, elements to engage the ends of the parts mounted in connection with and projecting upwardly from said unit, means to reciprocate said unit, means incorporated in part with said reciprocating means to cause said elements to be raised to a part engaging position with the movement of the unit toward the machine and to be lowered clear of said parts with the movement of the unit away from the machine means locking the unit against advancing movement until the elements are raised and a member mounted in connection and raisable with the elements to release said locking means as said elements are raised.

7. In box making machinery, a nailing machine, hoppers for separate box parts positioned in front of the machine, horizontal supporting means for the lowermost parts to maintain them at a predetermined level, a frame unit, means mounting said unit for horizontal movement toward and from the machine, elements to engage the ends of the parts, a structure from which said elements upstand movable vertically relative to the unit, means mounting said structure on said unit for horizontal movement therewith, toggle links disposed in a vertical plane and connected to the structure and unit and reciprocating means applied to said links to alternately extend and buckle the same and arranged so the links are buckled during the retractive movement of the unit and extended with the advancing movement of the same.

8. A structure as in claim 7, with means to prevent advancing movement of the unit at the beginning of the advancing stroke until the links are extended and the structure raised.

9. In box making machinery, a nailing machine, hoppers for separate box parts positioned in front of the machine, horizontal supporting means for the lowermost parts to maintain them at a predetermined level, a frame unit, means mounting said unit for horizontal movement toward and from the machine, elements to engage the ends of the parts, a structure from which said elements upstand movable vertically relative to the unit, means mounting said structure on said unit for horizontal movement therewith, means to reciprocate the unit and structure including means to raise the latter before any advancing movement takes place and to lower said structure before any retractive movement takes place.

10. A structure as in claim 9, with a latch device automatically engaging the unit at the back end of its retractive stroke and holding the same against advancing movement, and means functioning with the upward movement of the structure to release the latch.

11. An apparatus as in claim 7, with a horizontal pawl fixedly pivoted at one end, a member projecting laterally from the unit and engaged by said pawl when the unit arrives at the back end of its retractive stroke, and an element mounted in unitary connection with the vertically movable structure to engage and raise the pawl clear of the element as the links reach their limit of extension.

12. In box making machinery, a nailing machine, hoppers for separate box parts positioned in front of the machine, horizontal supporting means for the lowermost parts to maintain them at a predetermined level, a frame unit, means mounting said unit for horizontal movement toward and from the machine, elements to engage the ends of the parts, a structure from which said elements upstand movable vertically relative to the unit, means mounting said structure on said unit, toggle links disposed in a vertical plane and connected at their opposite ends to the unit and structure respectively, a horizontally movable member applied to said links, means for reciprocating said member, said links being disposed whereby with a movement of said member in one direction the links will be first buckled and with a movement in the opposite direction the links will be first extended, and means formed with the unit for engagement with the links when extended to prevent the links from buckling in the direction of advancing movement of the structure.

13. In box making machinery, a nailing mechanism, operating means therefor including a clutch, a movable arm normally holding said clutch disengaged, means to feed assembled box parts into a nailing position relative to said mechanism and including a reciprocating structure, a member projecting from the arm, an element on said structure to engage and push against the member so as to cause the arm to be moved to a non-holding position when the structure moves to a fully advanced position, and means for moving said member clear of the path of the element at will.

14. In box making machinery, a nailing mechanism, operating means therefor, releasable means normally holding the operating means inactive, means to feed assembled box parts into a nailing position relative to said mechanism, means to release said holding means by the feeding means when the parts have been moved to said nailing position, and means associated with said holding means and operable at will while the feeding means is in operation to prevent the holding means from being released.

15. Apparatus for making crate heads which include end posts and end slats to be nailed thereon, said apparatus including with a nailing machine, a hopper for the posts, a separate hopper for the slats, said hoppers being in front of the machine, a reciprocating feeding structure, and means provided with said structure to engage and feed and advance a pair of posts from the post hopper with successive advancing strokes of the reciprocating structure, and maintaining such posts spaced apart, and means also provided with said structure for successively feeding and advancing slats from the slat hopper into supported and assembled positions on the corresponding end posts.

16. An apparatus as in claim 15, with means also provided on said structure and included in part with said first two named feeding means to advance the assembled parts as a unit toward the nailing machine and without disturbing their spaced and assembled relationship.

17. Apparatus for making crate heads which include end posts and end slats to be nailed thereon, said apparatus including with a nailing machine, a hopper for the posts, a separate hopper for the slats, said hoppers being in front of the machine, and the post hopper being back of the slat hopper, a reciprocating feeding structure, means on the structure and functioning with successive advancing strokes thereof to initially engage and advance a pair of posts from the hopper and position them in predetermined spaced relation, means on said structure to further advance the pair of posts simultaneously with a subsequent advancing stroke of the structure, and means on said structure and included in part with said last named means to engage and advance a pair of slats and position and maintain them in predetermined relationship to the posts and functioning with said successive and subsequent advancing strokes.

18. Apparatus for making crate heads which include end posts and end slats to be nailed thereon, said apparatus including with a nailing machine, a hopper for the posts, a separate hopper for the slats, said hoppers being in front of the machine, and the post hopper being back of the slat hopper, a reciprocating feeding unit, said unit including a member to engage an end post, an element behind said member to engage another end post, a second element ahead of the member to engage an end slat, a third element ahead of said second element to engage an end post, pins to engage an end slat, another element ahead of the third element to engage an end slat, and a further element to engage an end post ahead of said other element; said member elements and pins being arranged relative to each other, to the hoppers and to the length of stroke of the structure as to feed and advance the corresponding box parts into properly assembled and spaced relation to each other with successive advancing strokes of the structure.

19. Apparatus for making crate heads which include end posts and end slats to be nailed thereon, said apparatus including with a nailing machine, separate hoppers for the slats and posts arranged so that said slats and posts are parallel to each other, a feeding and advancing structure, means on said structure to initially feed and advance a pair of posts and slats from the respective hoppers so that the posts are spaced apart a predetermined distance and the opposite edges of the slats are disposed on the posts with their opposite edges in the plane of the opposite edges of the corresponding posts, and means included in part with said first named means to engage and advance the posts and slats to the nailing machine while maintaining them in such spaced and assembled relation.

20. In box making machinery an end slat hopper, a panel hopper horizontally spaced from the same, a feed device to advance under the hoppers from the slat hopper in the direction of and beyond the panel hopper, and means formed with said device to successively engage and advance a pair of slats in spaced relation with the advancing movement of the device, and to engage and advance a panel in position between the slats after the slat first engaged has been advanced beyond the panel hopper.

FRED W. RIGGS.